United States Patent
Yin et al.

(10) Patent No.: US 12,119,911 B1
(45) Date of Patent: Oct. 15, 2024

(54) SUPERDIRECTIVE ANTENNA ARRAY MULTI-USER PRECODING METHOD, DEVICE AND MEDIUM

(71) Applicant: HUAZHONG UNIVERSITY OF SCIENCE AND TECHNOLOGY, Hubei (CN)

(72) Inventors: Haifan Yin, Hubei (CN); Liangcheng Han, Hubei (CN); Desheng Wang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/419,473

(22) Filed: Jan. 22, 2024

Related U.S. Application Data

(63) Continuation of application No. PCT/CN2023/103004, filed on Jun. 28, 2023.

(30) Foreign Application Priority Data

Jun. 12, 2023 (CN) .......................... 202310690841.9

(51) Int. Cl.
  *H04B 7/0456* (2017.01)
  *H04B 7/06* (2006.01)
(52) U.S. Cl.
  CPC ......... *H04B 7/0634* (2013.01); *H04B 7/0479* (2023.05); *H04B 7/0626* (2013.01)
(58) Field of Classification Search
  CPC .......... H04B 7/04; H04B 7/06; H04B 7/0456; H04B 7/0479; H04B 7/0626;
  (Continued)

(56) References Cited

U.S. PATENT DOCUMENTS 11,539,409 B2 * 12/2022 Ramireddy .......... H04B 7/0482
2013/0058433 A1 3/2013 Na et al.
(Continued)

FOREIGN PATENT DOCUMENTS

CN 105099530 11/2015
CN 107359921 11/2017
(Continued)

OTHER PUBLICATIONS

"International Search Report (Form PCT/ISA/210) of PCT/CN2023/103004," mailed on Dec. 12, 2023, pp. 1-3.
(Continued)

*Primary Examiner* — Shawkat M Ali
(74) *Attorney, Agent, or Firm* — JCIPRNET

(57) ABSTRACT

A superdirective antenna array multi-user precoding method, a device, and a medium belonging to the field of wireless communication are provided. The method includes: constructing a unitary matrix $U \in C^{M \times M}$ for terminal users U, last $N(N \leq K-1)$ columns of the unitary matrix U being an orthonormal basis of the interfering user channel space span $\{h_i, i=1, \ldots, K, i \neq u\}$ respectively, where N is a dimension of the interfering user channel space, M is the total number of antennas on a network device side, K is the total number of terminal users communicating, and $M \geq K$ is satisfied; intercepting the first M−N rows of a matrix $U^H h_u$ to obtain a matrix $\eta_u$, where $\eta_u \in C^{(M-N) \times 1}$, $h_u$ represents channel state information of the $u^{th}$ terminal user, and the superscript H represents a conjugate transpose; intercepting first M−N rows and first M−N columns of a matrix $U^H Z U$ to obtain a matrix $\Xi$, where $\Xi \in C^{(M-N) \times (M-N)}$ a matrix $Z \in C^{M \times M}$, elements in Z represent coupling coefficients of any two antennas; calculating a precoding matrix $a_u = U$
(Continued)

$$a_u = U \begin{pmatrix} \alpha_u \\ 0 \end{pmatrix}$$

of the $u^{th}$ terminal user, where $\alpha_u = \Xi^{-1} \eta_u^*$.

13 Claims, 3 Drawing Sheets

(58) Field of Classification Search
CPC ........... H04B 7/0634; H04L 1/00; H04L 5/00; H04L 27/28; H04W 24/08; H04W 40/00; H04W 72/04; H04W 72/08; H04W 72/12
USPC ........ 370/252, 330; 375/219, 260, 262, 267, 375/295, 316, 346; 455/422.1
See application file for complete search history.

(56) References Cited

U.S. PATENT DOCUMENTS

2016/0352012 A1* 12/2016 Foo ................... H04L 25/03343
2017/0244513 A1* 8/2017 Pitakdumrongkija ......................
H04B 7/0452

FOREIGN PATENT DOCUMENTS

| CN | 111342874 | 6/2020 |
|---|---|---|
| CN | 114884598 | 8/2022 |

OTHER PUBLICATIONS

"Written Opinion of the International Searching Authority (Form PCT/ISA/237) of PCT/CN2023/103004," mailed on Dec. 12, 2023, , with English translation thereof, pp. 1-6.

* cited by examiner

SUPERDIRECTIVE ANTENNA ARRAY MULTI-USER PRECODING METHOD, DEVICE AND MEDIUM

CROSS-REFERENCE TO RELATED APPLICATION

This application is a continuation of international application of PCT application serial no. PCT/CN2023/103004, filed on Jun. 28, 2023, which claims the priority benefit of China application no. 202310690841.9, filed on Jun. 12, 2023. The entirety of each of the above mentioned patent applications is hereby incorporated by reference herein and made a part of this specification.

BACKGROUND

Technical Field

The disclosure belongs to the field of wireless communication, and in particular, relates to a superdirective antenna array multi-user precoding method, a device, and a medium.

Description of Related Art

In the early research on Massive MIMO, the channel characteristics when the number of antennas at the base station tended to be infinite were analyzed in depth. However, in practical applications, due to immature development of technology and theory, the distance between antennas is still limited by half-wavelength, therefore, there are still challenges in deploying a large number of antennas on a fixed-size antenna panel to approach the theoretical channel capacity. In recent years, with the further maturity of Massive MIMO technology and the increasing requirements for spectrum efficiency of communication systems, how to solve the problem of improving system throughput by deploying ultra-dense antenna arrays has become a difficulty in the field of wireless communication.

In the context of 5G, faced with the shortcomings of large signal attenuation and the inability to deploy ultra-large-scale antenna arrays, the superdirective antenna arrays, as narrow-beam superdirective arrays, have the potential to become a key technology for the next generation of wireless communication systems. In conventional antenna arrays, in order to reduce mutual coupling between antennas, an antenna spacing of approximately half a wavelength is used most of the time, but this also results in the array gain being only proportional to the number of antennas (M). In a superdirective antenna array, by reducing the distance between antennas and making full use of the strong mutual coupling between antennas, the performance of the antenna array gain may be improved in proportion to $M^2$.

However, research on the applications of the superdirective antenna arrays in the wireless communication systems have not been carried out in depth at present. The conventional MIMO arrays may achieve spatial multiplexing through beamforming, so that system throughput is significantly improved. However, considering the coupling effect, corresponding solutions to the problem of how to use the superdirective antenna arrays to implement multi-user wireless communication scenarios are still unavailable at present.

SUMMARY

In response to the above defects or the needs for improvement, the disclosure provides a superdirective antenna array multi-user precoding method, a device, and a medium aiming to solve the technical problem that the system spectral efficiency is not improved when the base station is a compact array due to the inability to achieve superdirectivity of the array since the conventional multi-user beamforming solution ignores the coupling effect between antennas.

To achieve the above, in the first aspect, the disclosure provides a superdirective antenna array multi-user precoding method, including:

constructing a unitary matrix $U \in C^{M \times M}$ for terminal users U, last $N(N \leq K-1)$ columns of the unitary matrix U being an orthonormal basis of an interfering user channel space span $\{h_i, i=1, \ldots, K, i \neq u\}$ respectively, N is a dimension of the interfering user channel space, $h_i \in C^{M \times 1}$ represents channel state information of the $i^{th}$ terminal user, M is the total number of antennas on a network device side, K is the total number of terminal users communicating, and $M \geq K$ is satisfied;

intercepting first $M-N$ rows of a matrix $U^H h_u$ to obtain matrix $\eta_u$, wherein $\eta_u \in C^{(M-N) \times 1}$, $h_u$ represents the channel state information of the $u^{th}$ terminal user, and the superscript H represents a conjugate transpose;

intercepting first $M-N$ rows and first $M-N$ columns of a matrix $U^H Z U$ to obtain a matrix $\Xi$, where $\Xi \in C^{(M-N) \times (M-N)}$ the matrix $Z \in C^{M \times M}$, elements in Z represent coupling coefficients of any two antennas;

calculating a precoding matrix $a_u = U$ $$a_u = U \begin{pmatrix} \alpha_u \\ 0 \end{pmatrix}$$

of the $u^{th}$ terminal user, where $\alpha_u = \Xi^{-1} \eta_u^*$, the superscript * represents a conjugation.

Further, before intercepting the first $M-N$ rows and the first $M-N$ columns of the matrix $U^H Z U$ to obtain the matrix $\Xi$, the method further includes: updating the matrix Z to $Z+\Lambda$, where $\Lambda \in C^{M \times M}$ is a regularization matrix of the matrix Z.

Further, the regularization matrix $\Lambda$ is:

$$\Lambda = \frac{r_{loss}}{R_{rad}} I_M,$$

$$r_{loss} = \frac{L}{6\pi a} \sqrt{\frac{\pi f \mu}{\sigma}}, \text{ and}$$

$$R_{rad} \approx 24.7(kL/2)^{2.5},$$

wherein $r_{loss}$ and $R_{rad}$ are a loss and a radiation impedance of antenna respectively, $I_M$ is a unit matrix of M×M, and L, $a$, $f$, $\mu$, $\sigma$, and $\kappa$ are a length, a radius, an operating frequency, a magnetic permeability, a conductivity and a wave number of the antenna respectively.

Further, the regularization matrix $\Lambda$ is:

$$\Lambda = \frac{\epsilon^2}{4\pi} \int_0^{2\pi} \int_0^{\pi} |k(\theta, \phi)|^2 d\theta d\phi I_M,$$

wherein $\epsilon^2$ is a Gaussian noise power, $\kappa(\theta, \Phi)$ is a pattern function of the antenna, $\theta$ and $\Phi$ are far-field coordinate components in a spherical coordinate system, $I_M$ is a unit matrix of M×M.

Further, the regularization matrix $\Lambda$ is:

$$\Lambda = \frac{r_{loss}}{R_{rad}}I_M + \frac{\epsilon^2}{4\pi}\int_0^{2\pi}\int_0^{\pi}|k(\theta,\phi)|^2 d\theta d\phi I_M,$$

$$r_{loss} = \frac{L}{6\pi a}\sqrt{\frac{\pi f \mu}{\sigma}}, \text{ and}$$

$$R_{rad} \approx 24.7 \, (kL/2)^{2.5},$$

wherein $r_{loss}$ and $R_{rad}$ are a loss and a radiation impedance of an antenna respectively, $I_M$ is a unit matrix of M×M, L, $\alpha$, $f$, $\mu$, $\sigma$, and $\kappa$ are a length, a radius, an operating frequency, a magnetic permeability, a conductivity and a wave number of the antenna respectively, $\epsilon^2$ is a Gaussian noise power, $\kappa(\theta, \Phi)$ is a pattern function of the antenna, $\theta$ and $\Phi$ are far-field coordinate components in a spherical coordinate system.

Further, the construction of the unitary matrix $U \in C^{M \times M}$ specifically involves:

Constructing a total interference covariance matrix:

$$R_{int} = \sum_{i \neq u}(h_i h_i^H)$$

performing SVD decomposition on $R_{int}$ to obtain:

$$R_{int} = W^H \Lambda W$$

the unitary matrix U is:

[last (M−N) columns of W, first N columns of W].

Further, the matrix $$z = \begin{bmatrix} z_{11} & \cdots & z_{1M} \\ \vdots & \ddots & \vdots \\ z_{M1} & \cdots & z_{MM} \end{bmatrix},$$

$$z_{mn} = \frac{1}{4\pi}\int_0^{2\pi}\int_0^{\pi}|k(\theta,\phi)|^2 e^{jk\hat{r}\cdot r_m}e^{-jk\hat{r}\cdot r_n}\sin\theta d\theta d\phi;$$

wherein $z_{mn}$ represents coupling coefficients of the $m^{th}$ antenna and the $n^{th}$ antenna, $\kappa(\theta, \Phi)$ is a pattern function of the antenna, $\theta$ and $\Phi$ are far-field coordinate components in a spherical coordinate system, k is the wave number of the antenna, $\hat{r}$ is a unit vector in the spherical coordinate system, $r_m$ and $r_n$ are the coordinates of the $m^{th}$ antenna and the $n^{th}$ antenna respectively, m=1, . . . , M and n=1, . . . ,M.

Further, the last N(N≤K−1) columns of the unitary matrix U being the orthonormal basis of the interfering user channel space span $\{h_i, i=1, \ldots, K, i \neq u\}$ respectively, includes:

Let $[v_1, \ldots, v_{K-1}] \in C^{M \times (K-1)}$ be a matrix formed by an interfering user channel vector, if N=K−1, the last K−1 columns of the unitary matrix U are $$\frac{\overline{v}_i}{\|\overline{v}_i\|},$$

wherein:
i=1, . . . , K−1, $$\begin{cases} \overline{v}_1 = \frac{v_1}{\|v_1\|} \\ \overline{v}_2 = v_2 - \frac{\overline{v}_1^H v_2}{\|\overline{v}_1\|}\overline{v}_1, \\ \overline{v}_3 = v_3 - \frac{\overline{v}_1^H v_3}{\|\overline{v}_1\|}\overline{v}_1 - \frac{\overline{v}_2^H v_3}{\|\overline{v}_2\|}\overline{v}_2 \\ \vdots \\ \overline{v}_{K-1} = v_{K-1} - \frac{\overline{v}_1^H v_{K-1}}{\|\overline{v}_1\|}\overline{v}_1 - \ldots - \frac{\overline{v}_{K-2}^H v_{K-1}}{\|\overline{v}_{K-2}\|}\overline{v}_{K-2} \end{cases};$$

if N<K−1, obtaining N non-zero vectors after calculating $$\frac{\overline{v}}{\|\overline{v}_i\|},$$

i=1, . . . , K−1, selecting the N non-zero vectors as the last N columns of U.

In the second aspect, the disclosure further provides a superdirective antenna array multi-user precoding method, including:

constructing a unitary matrix $W \in C^{M \times M}$ for terminal users U, first N(N≤K−1) columns of the unitary matrix W are an orthonormal basis of an interfering user channel space span $\{h_i, i=1, \ldots, K, i \neq u\}$ respectively, wherein N is a dimension of the interfering user channel space, $h_i \in C^{M \times 1}$ represents channel state information of the $i^{th}$ terminal user, M is the total number of antennas on a network device side, K is the total number of terminal users communicating, and M≥K is satisfied;

intercepting last M−N columns of the unitary matrix W to obtain a matrix R, wherein $R \in C^{M \times (M-N)}$;

calculating a precoding matrix $a_u = RR^H a_u^{opt}$ of the $u^{th}$ terminal user, wherein $a_u^{opt} = Z^{-1}h_u^*$, the superscript * represents a conjugation, $h_u$ represents the channel state information of the $u^{th}$ terminal user, the matrix $Z \in C^{M \times M}$, elements in Z represent coupling coefficients of any two antennas, the superscript H represents a conjugate transpose.

In the third aspect, the disclosure further provides a network device, including:

a structural unit, configured to construct a unitary matrix $U \in C^{M \times M}$ for terminal users U, last N(N≤K−1) columns of the unitary matrix U are an orthonormal basis of an interfering user channel space span $\{h_i, i=1, \ldots, K, i \neq u\}$ respectively, wherein N is a dimension of the interfering user channel space, $h_i \in C^{M \times 1}$ represents channel state information of the $i^{th}$ terminal user, M is the total number of antennas on a network device side, K is the total number of terminal users communicating, and M≥K is satisfied;

a first interception unit, configured to intercept first M−N rows of a matrix $U^H h_u$ to obtain a matrix $\eta_u$, where $\eta_u \in C^{(M-N) \times 1}$, $h_u$ represents the channel state information of the $u^{th}$ terminal user, and the superscript H represents a conjugate transpose;

a second interception unit, configured to intercept first M−N rows, first M−N columns of the matrix $U^H Z U$ to obtain a matrix $\Xi$, wherein $\Xi \in C^{(M-N)(M-N)}$, the matrix $Z \in C^{M \times M}$, elements in Z represent coupling coefficients of any two antennas;

a calculation unit, configured to calculate a precoding matrix $a_u = U$ $$a_u = U\begin{pmatrix} \alpha_u \\ 0 \end{pmatrix}$$

of the $u^{th}$ terminal user, the superscript * represents a conjugation.

In the fourth aspect, the disclosure further provides a network device, including:

a structural unit, configured to construct a unitary matrix $W \in C^{M \times M}$ for terminal users u, first $N(N \leq K-1)$ columns of the unitary matrix W are an orthonormal basis of an interfering user channel space span $\{h_i, i=1, \ldots, K, i \neq u\}$ respectively, wherein N is a dimension of the interfering user channel space, $h_i \in C^{M \times 1}$ represents channel state information of an $i^{th}$ terminal user, M is the total number of antennas on a network device side, K is the total number of terminal users communicating, and $M \geq K$ is satisfied;

an interception unit, configured to intercept last M−N columns of the unitary matrix W to obtain a matrix R, wherein $R \in C^{M \times (M-N)}$;

a calculation unit, configured to calculate a precoding matrix $a_u = RR^H a_u^{opt}$ of the $u^{th}$ terminal user, where $a_u^{opt} = Z^{-1} h_u^*$, the superscript * represents a conjugation, $h_u$ represents the channel state information of the $u^{th}$ terminal user, the matrix $Z \in C^{M \times M}$ elements in Z represent coupling coefficients of any two antennas, and the superscript H represents a conjugate transpose.

In the fifth aspect, the disclosure further provides an electronic device, including:

a processor; and a memory, configured to store an executable command of the processor;

wherein, the processor is configured to execute the superdirective antenna array multi-user precoding method according to the first aspect or the second aspect by executing the executable command.

In the sixth aspect, the disclosure further provides a computer readable storage medium, the computer readable storage medium stores a computer-executable command, when a processor executes the computer-executable command, the superdirective antenna array multi-user precoding method according to the first aspect or the second aspect is implemented.

In general, the above technical solutions provided by the disclosure have the following beneficial effects compared to the related art:

(1) The disclosure provides a low-complexity solution to solve the convex optimization problem by utilizing the asymptotic orthogonal characteristics of different user channels, by constructing a unitary matrix and performing corresponding mathematical transformation to obtain the precoding matrix of each terminal user. The coupling between antennas is fully considered in the solution, and communication signals between different terminal users are better distinguished and processed, this can significantly improve the spectral efficiency and capacity of the system to satisfy the growing communication needs.

(2) The disclosure introduces a regularization matrix to overcome the problem of reduced system capacity due to ohmic loss and inaccurate channel estimation in an actual superdirective multi-user communication system.

(3) The disclosure provides a simplified solution to solve the convex optimization problem, specifically: first finding the optimal solution of the objective function, and then projecting this optimal solution on the null space of the interfering user, thereby avoiding multiple matrix operations.

DESCRIPTION OF THE EMBODIMENTS

Figure 1:
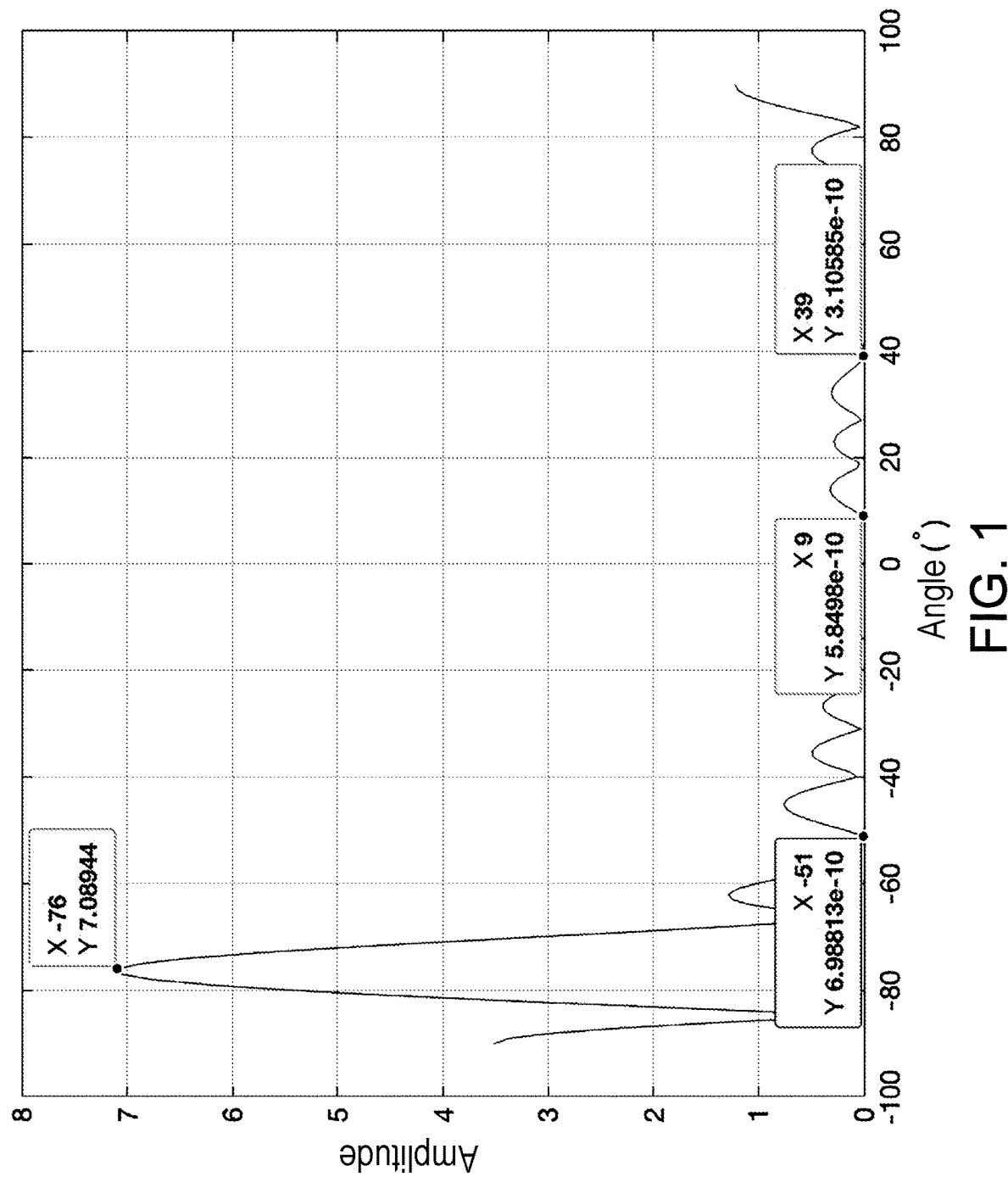
FIG. 1 is a direction graph obtained by performing superdirective zero forcing beamforming on a target user through simulation provided by the disclosure.

In order to make the objectives, technical solutions, and advantages of the disclosure clearer and more comprehensible, the disclosure is further described in detail with reference to the drawings and embodiments. It should be understood that the specific embodiments described herein serve to explain the invention merely and are not used to limit the invention.

The disclosure may be applied to a wireless communication system. It should be noted that the wireless communication system mentioned in the embodiments of the disclosure includes but are not limited to: a narrowband Internet of Things system (NB-IoT), a global system for mobile communications (GSM), an enhanced data rate for GSM evolution (EDGE), a wideband code division multiple access (WCDMA) system, a code division multiple access 200 (CDMA2000) system, a time division-synchronization code division multiple access (TD-SCDMA) system, a long term evolution (LTE) system, and the three major application scenarios of the 5G mobile communication system: the enhanced mobile broad band (eMBB), ultra-reliable and low latency communications (URLLC), and massive machine-type communications (mMTC).

The communication apparatus involved in the disclosure mainly includes a network side device or a terminal device. A transmitting end is the network side device and a receiving end is the terminal device in the disclosure, or the transmitting end is the terminal device and the receiving end is the network side device in the disclosure.

The terminal device of the disclosure may be a wireless terminal. The wireless terminal may refer to a device that provides voice and/or other service data connectivity to a user, a handheld device with wireless connectivity capabilities, or other processing devices connected to a wireless modem. The wireless terminal may communicate with one or more core networks via a radio access network(RAN). The wireless terminal may be a mobile terminal, such as a mobile phone (or a "cellular" phone) and a computer with a mobile terminal, such as a portable, pocket-sized, handheld, computer-built-in, or a vehicle-mounted mobile device that exchanges languages and/or data with the radio access network. For instance, the wireless terminal is a personal communications service (PCS) phone, a cordless phone, a session initiation protocol (IP) phone, a wireless local loop (WLL) station, a personal digital assistant (PDA) and the like. The wireless terminal may also be called a system, a subscriber unit, a subscriber station, a mobile station, mobile platform, a remote station, a remote terminal, an access terminal, a user terminal, a user agent, or a user device or user equipment, which is not limited herein.

The network side device of the disclosure may be a device used to communicate with the terminal device, such as a base transceiver station, BTS) in a GSM system or a CDMA system, a base station (NodeB, NB) in a WCDMA system, or an evolutional base station (evolutional Node B, eNB, or eNodeB) in an LTE system, or a next generation base station (next generation eNodeB or ngeNB) in the LTE system. Alternatively, the network side device may be a relay station, an access point (AP), a vehicle-mounted device, a wearable device, network side device in a 5G network, or network side device in a future evolved public land mobile network (PLMN), etc., for example, it may be a new generation base station (generation nodeB, gNB, or gNodeB).

The following describes the technical status of a super-directive antenna array multi-user precoding method.

1.1. System Model

A channel between the $s^{th}$ antenna of a base station and the $u^{th}$ terminal user may be expressed as:

$$h_{u,s}(f,t) = \sum_{p=1}^{P} \beta_p e^{\frac{j2\pi \hat{r}_{rx,p}^T \bar{d}_{rx,u}}{\lambda_0}} e^{\frac{j2\pi \hat{r}_{tx,p}^T \bar{d}_{tx,s}}{\lambda_0}} e^{-j2\pi f \tau_p} e^{j\omega_p t}, \quad (1)$$

wherein $\beta_p$ and $\tau_P$ are a complex amplitude and a time delay of the $p^{th}$ path respectively, $\lambda_0$ is the wavelength of a center frequency. $\theta_{p,ZOD}$, $\Phi_{p,AOD}$, $\theta_{p,ZOA}$, and $\Phi_{p,AOA}$ represent a pitch angle of departure, a horizontal angle of departure, a pitch angle of arrival, and a horizontal angle of arrival of the $p^{th}$ path respectively.

$\hat{r}_{rx,p}$ is a spherical unit vector with the horizontal angle of arrival $\Phi_{p,AOA}$ and the pitch angle of arrival $\theta_{p,ZOA}$:

$$\hat{r}_{rx,p} \triangleq \begin{bmatrix} \sin\theta_{p,ZOA}\cos\phi_{p,AOA} \\ \sin\theta_{p,ZOA}\sin\phi_{p,AOA} \\ \cos\theta_{p,ZOA} \end{bmatrix}. \quad (2)$$

$\hat{r}_{tx,p}$ is a spherical unit vector with the pitch angle of departure $\theta_{p,ZOD}$ and the horizontal angle of departure $\Phi_{p,AOD}$:

$$\hat{r}_{tx,p} \triangleq \begin{bmatrix} \sin\theta_{p,ZOD}\cos\phi_{p,AOD} \\ \sin\theta_{p,ZOD}\sin\phi_{p,AOD} \\ \cos\theta_{p,ZOD} \end{bmatrix}, \quad (3)$$

wherein $\bar{d}_{rx,u}$ is a position vector of the $i^{th}$ terminal user in a 3D Cartesian coordinate system, and similarly, $\bar{d}_{tx,z}$ is a position vector of the $s^{th}$ antenna of the base station, the exponential term $e^{j\omega,t}$ is the Doppler of the $p^{th}$ path, wherein t represents time, $\omega_p$ is $\omega_p \triangleq r_{rx,p}^T \bar{v}/\lambda_0$, where $\bar{v}$ represents a speed vector of a terminal user UE:

$$\bar{v} = v[\sin\theta_v \cos\Phi_v \sin\theta_v \sin\Phi_v \cos\theta_v]^T \quad (4),$$

wherein $\theta$, $\Phi_r$, $\theta_c$ are a UE moving speed, a horizontal angle of traveling, and a pitch angle of traveling respectively.

The base station includes $N_v$ rows and $N_h$ columns of antennas. The number of base station antennas is represented by $N_t$, and $N_t = N_v N_h$. The number of UE antennas is represented by $N_r$. An entire bandwidth includes $N_f$ subcarriers, and an interval between adjacent subcarriers is $\Delta f$.

Let $h_u(f,t) \in C^{N \times 1}$ represent the channels from all antennas of the base station to the $u^{th}$ terminal user UE at time t and frequency $f$. Writing the channels on all $N_f$ subcarriers in matrix form:

$$H_u(t) \triangleq [h_u(f_1,t)h_u(f_2,t)\ldots h_u(f_N,t)] \quad (5),$$

Wherein $f_1$ is a frequency of the $i^{th}$ subcarrier and satisfies $1 \leq i \leq N_f$.

A signal received by the $u^{th}$ terminal user UE on a subcarrier $f_i$ at time t is:

$$y = h_u^T(f_i,t)w_u(f_i,t)x + n \quad (6),$$

wherein $w_u(f_i,t) \in C^{N \times 1}$ is a beamforming precoding vector of the base station for the $u^{th}$ terminal user UE, and n is Gaussian white noise obeying a zero mean and a variance $\sigma^2$. Considering a specific time t and the frequency $f_i$, $h_u^T(f_i,t)$ is simply expressed as $h_u^T$.

1.2. Solution One of Conventional Multi-User Beamforming: Maximum Ratio Transmission Maximum ratio transmission (MRT) is a multi-antenna technology that uses channel state information at the receiving end to optimize an antenna weight at the transmitting end, so that a signal-to-noise ratio of the received signal is maximized.

The mathematical expression of a maximum ratio transmission beamforming vector may be expressed as:

$$W_{MRT} = \beta h^* \quad (7)$$

wherein $\beta$ is a power constraint coefficient of the base station on the beamforming vector, h is the channel state information (CSI) of a target user measured by the base station, and $h^*$ is its conjugate. By allocating different beamforming vectors to different users based on their channel state information, the purpose of multi-user scenario communication is achieved. In a conventional MIMO system, the MRT solution focuses on maximizing the user's signal gain. However, in a multi-user system, as the correlation of transmission channels increases, this solution may cause the performance of the entire system to decline rapidly because this solution does not consider how to deal with interference between users.

1.3 Solution Two of Conventional Multi-User Beamforming: Zero Forcing Transmission The maximum ratio transmission solution only focuses on the useful signal of the target user and ignores the interference of other users. In contrast, the zero forcing transmission (ZF) solution strives to eliminate interference between different users but does not consider the impact of noise. To be specific, a precoding matrix of the MRT solution may be expressed as a product of a normalized value of a target user channel vector and a transmitted signal, and a precoding matrix of the ZF solution may be expressed as a product of pseudo-inverse of a channel transmission matrix and a received signal vector, so as to eliminate interference between different users and obtain the required signal.

$$W_{ZF} = \beta H(H^H)^\dagger \quad (8),$$

wherein $H = [h_1, h_2, \ldots, h_K]$ is a matrix composed of the channel state information of K terminal users, and the $k^{th}$ column in $W_{ZF}$ is a precoding vector of a $k^{th}$ terminal user. The ZF solution may achieve favorable system and speed in areas with high signal-to-noise ratio. In an area with a low signal-to-noise ratio, the total achievable rate of the system is not as high as that provided by the MRT solution because the impact of noise is ignored.

1.4 Superdirective Beamforming

To facilitate analysis, assuming an antenna array consisting of M antennas with a spacing of d is provided, where a pattern function of each antenna is $\kappa(\theta, \Phi)$, and $\theta$ and $\Phi$ are far-field coordinate components in a spherical coordinate system, the far-field pattern function $f(\theta, \Phi)$ of this array is:

$$f(\theta, \phi) = \sum_{m=1}^{M} a_m k(\theta, \phi) e^{jk\hat{r}\cdot r_m}, \quad (9)$$

wherein $\alpha_m$ is an excitation coefficient of the $m^{th}$ antenna, k is a wave number, $\hat{r}$ is a unit vector in the spherical coordinate system, $r_m$ are coordinates of the $m^{th}$ antenna, and m=1, . . . ,M.

A directivity coefficient $D(\theta_0, \Phi_0)$ in a direction $(\theta_0, \Phi_0)$ is defined as:

$$D(\theta_0, \phi_0) = \frac{\left|\sum_{m=1}^{M} a_m k(\theta_0, \phi_0) e^{jk\hat{r}_0\cdot r_m}\right|^2}{\frac{1}{4\pi}\int_0^{2\pi}\int_0^{\pi}\left|\sum_{m=1}^{M} a_m k(\theta, \phi) e^{jk\hat{r}\cdot r_m}\right|^2 \sin\theta d\theta d\phi}, \quad (10)$$

simplify the denominator in the above formula:

$$\frac{1}{4\pi}\int_0^{2\pi}\int_0^{\pi}\left|\sum_{m=1}^{M} a_m k(\theta, \phi) e^{jk\hat{r}\cdot r_m}\right|^2 \sin\theta d\theta d\phi = \quad (11)$$

$$\frac{1}{4\pi}\int_0^{2\pi}\int_0^{\pi}\sum_{n=1}^{M}\sum_{m=1}^{M} a_n a_m^* |k(\theta, \phi)|^2 e^{jk\hat{r}\cdot r_n} e^{-jk\hat{r}\cdot r_m}\sin\theta d\theta d\phi =$$

$$\sum_{n=1}^{M}\sum_{m=1}^{M} a_n a_m^* \frac{1}{4\pi}\int_0^{2\pi}\int_0^{\pi} |k(\theta, \phi)|^2 e^{jk\hat{r}\cdot x_n} e^{-jk\hat{r}\cdot r_m}\sin\theta d\theta d\phi,$$

for the integral term in the above formula, let:

$$z_{mn} = \frac{1}{4\pi}\int_0^{2\pi}\int_0^{\pi} |k(\theta, \phi)|^2 e^{jk\hat{r}\cdot r_m} e^{-jk\hat{r}\cdot r_n}\sin\theta d\theta d\phi, \quad (12)$$

so, formula (11) may be rewritten as:

$$\sum_{m=1}^{M}\sum_{n=1}^{M} a_n a_m^* \frac{1}{4\pi}\int_0^{2\pi}\int_0^{\pi} |k(\theta, \phi)|^2 e^{jk\hat{r}\cdot r_n} e^{-jk\hat{r}\cdot x_m}\sin\theta d\theta d\phi, \quad (13)$$

$$\sum_{m=1}^{M}\sum_{n=1}^{M} a_n a_m^* z_{mn}.$$

for convenience of expression, formula (10) may be simplified to $$D = \frac{a^T e e^H a^*}{a^T Z a}, \quad (14)$$

wherein, $$a=[a_1, a_2, \ldots, a_M]^T, \quad (15)$$

and

Z is a normalized real impedance matrix:

$$Z = \begin{bmatrix} z_{11} & \cdots & z_{1M} \\ \vdots & \ddots & \vdots \\ z_{M1} & \cdots & z_{MM} \end{bmatrix}. \quad (17)$$

$$e=[e^{jkr\cdot r_1}k(\theta,\Phi), e^{jkr\cdot rs}k(\theta,\Phi), \ldots, e^{thjr\cdot rw}k(\theta,\Phi)]^T. \quad (16)$$

The beamforming vector a that maximizes formula (14) may be solved as:

$$a=Z^{-1}e^*, \quad (18), \text{ and}$$

the maximized directional coefficient is:

$$D_{max}=e^H Z^{-1}e. \quad (19).$$

Based on the above description, it can be seen that the research on superdirective arrays only discusses how to maximize the directional gain from the perspective of antenna arrays at present, and has not been combined with actual communication systems. How to use the superdirective arrays to improve the spectral efficiency of the entire system is still a challenge. The conventional multi-user beamforming solution ignores the coupling effect between antennas, resulting in the inability to achieve the superdirectivity of the array, so that the purpose of improving the system spectral efficiency when the base station is a compact array cannot be achieved.

To solve this problem, a superdirective beamforming algorithm suitable for multi-users needs to be studied. The algorithm shall consider the coupling between antennas and be able to better distinguish and process communication signals between different users. By using this algorithm, the spectral efficiency and capacity of the system may be significantly improved to satisfy the growing communication needs.

In this regard, in a compact antenna array in the disclosure, the coupling effect between antennas is incorporated into an analysis model to provide a multi-user beamforming precoding algorithm to improve spectral efficiency.

Embodiment One 2.1. Disclosure Solution One: Superdirective Zero Forcing Multi-User Transmission Considering that there are M antennas on the base station side communicating with K terminal users at the same time, their respective channel state information is $[h_1, h_2, \ldots, h_K]$, which satisfies M≥K. According to formula (14), the directional coefficient $D_u$ of the $u^{th}$ terminal user is:

$$D_u = \frac{a_u^H h_u h_u^H a_u}{a_u^H Z a_u}, \quad (20)$$

where $a_u$ is the beamforming vector of the $u^{th}$ terminal users. In order to suppress the interference of other users and maximize the directional gain of the target user, the following optimization problem is presented by the disclosure:

$$\max \frac{a_u^H h_u h_u^H a_u}{a_u^H Z a_u} \quad (21)$$

$$\text{s.t. } h_i^H a_u = 0, i = 1, \ldots, K, i \neq u.$$

The problem is a linearly constrained convex optimization problem. Some optimization toolboxes may be used to solve the problem, such as CVX, Gurobi, etc., but it requires multiple iterations of optimization, which is highly complex and cannot satisfy the real-time communication needs of the base station. In the present invention, an optimal low-complexity solution is provided by utilizing the asymptotic orthogonal characteristics of different user channels.

First, an interfering user channel is orthogonalized, let $[v_1, \ldots, v_{K-1}] \in C^{M \times (K-1)}$ be a matrix formed by an interfering user channel vector, then the orthogonalized interfering user orthonormal basis is $$\frac{\bar{v}_i}{\|\bar{v}_i\|},$$

$i=1, \ldots, K-1$, wherein:

$$\begin{cases} \bar{v}_1 = \frac{v_1}{\|v_1\|} \\ \bar{v}_2 = v_2 - \frac{\bar{v}_1^H v_2}{\|\bar{v}_1\|} \bar{v}_1, \\ \bar{v}_3 = v_3 - \frac{\bar{v}_1^H v_3}{\|\bar{v}_1\|} \bar{v}_1 - \frac{\bar{v}_2^H v_3}{\|\bar{v}_2\|} \bar{v}_2 \\ \vdots \\ \bar{v}_{k-1} = v_{k-1} - \frac{\bar{v}_1^H v_{k-1}}{\|\bar{v}_1\|} \bar{v}_1 - \cdots - \frac{\bar{v}_{K-2}^H v_{k-1}}{\|\bar{v}_{K-2}\|} \bar{v}_{K-2} \end{cases}$$

Constructing a unitary matrix $U \in C^{M \times M}$u is considered, satisfying $U^H U = I_M$, last $N(N \leq K-1)$ columns of the unitary matrix U are the orthonormal basis $$\frac{\bar{v}_i}{\|\bar{v}_i\|},$$

$i=1, \ldots, K-1$ of the interfering user channel space span $\{h_i, i=1, \ldots, K, i \neq u\}$ respectively, wherein N is a dimension of the interfering user channel space. If $N<K-1$, the orthonormal basis is N non-zero column vectors, selecting these N non-zero column vectors as the last N columns of U. It should be noted that in the last N columns of the unitary matrix U, the $1^{st}$ column does not need to be $$\frac{\bar{v}_1}{\|\bar{v}_1\|}$$

and the $2^{nd}$ column does not need to be $$\frac{\bar{v}_2}{\|\bar{v}_2\|}.$$

The order can be disrupted, as long as any two columns are different.
Let $$U^H a_u = \begin{pmatrix} \alpha_u \\ \beta \end{pmatrix}, \quad (23)$$

wherein $\alpha_u \in C^{(M-N) \times 1}$ and $\beta \in C^{N \times 1}$, and to satisfy the linear constraints in the optimization problem, let $$\beta = \left[ \ldots, \frac{\bar{v}_{u-1}}{\|\bar{v}_{u-1}\|}, \frac{\bar{v}_{u+1}}{\|\bar{v}_{u+1}\|}, \ldots \right]^H a_u = 0,$$

$$U^H h_u = \begin{pmatrix} \eta_u \\ \gamma \end{pmatrix}, \quad (24)$$

wherein $\eta_u \in C^{(M-N) \times 1}$ and $\gamma \in C^{N \times 1}$.
Let $$U^H Z U = \begin{pmatrix} \Xi & \Psi \\ \Psi & \Upsilon \end{pmatrix}, \quad (25)$$

wherein $\Xi \in C^{(M-N) \times (M-N)}$ and $\Xi$ and $\Xi$ are also block matrices, then $$\frac{a_u^H h_u h_u^H a_u}{a_u^H Z a_u} = \quad (26)$$

$$\frac{a_u^H U U^H h_u h_u^H U U^H a_u}{a_u^H U U^H Z U U^H a_u} = \frac{(\alpha_u^H, 0)\begin{pmatrix}\eta_u \\ \gamma\end{pmatrix}(\eta_u^H, \gamma)\begin{pmatrix}\alpha_u \\ 0\end{pmatrix}}{(\alpha_u^H, 0)\begin{pmatrix}\Xi & \Psi \\ \Psi & \Upsilon\end{pmatrix}\begin{pmatrix}\alpha_u \\ 0\end{pmatrix}} = \frac{\alpha_u \eta_u \eta_u^H \alpha_u}{\alpha_u \Xi \alpha_u},$$

then the optimization problem (21) may be transformed into $$\max \frac{\alpha_u \eta_u \eta_u^H \alpha_u}{\alpha_u \Xi \alpha_u}. \quad (27)$$

Analogous to formula (18), the closed-form solution of this problem is:

$$\alpha_u = \Xi^{-1} \eta_u \quad (28).$$

According to formula (23), the following may be obtained $$a_u = U \begin{pmatrix} \alpha_u \\ \beta \end{pmatrix} = U \begin{pmatrix} \alpha_u \\ 0 \end{pmatrix}. \quad (29)$$

For the construction of the unitary matrix U, only the last $N(N \leq K-1)$ columns of U are the orthonormal bases of the interfering user channel space span $\{h_i, i=1, \ldots, K, i \neq u\}$. The following solutions are adopted in this embodiment, and certainly, other solutions may also be adopted as long as they satisfy the condition of U, such as Schmidt orthogonalization process.

First, constructing the total interference covariance matrix:

$$R_{int} = \sum_{i \neq u} (h_i h_i^H). \quad (30)$$

Performing SVD decomposition on $R_{int}$ to obtain:

$$R_{int} = W^H \Lambda W \quad (31).$$

The first N columns of W are the unit orthogonalized channels of the interfering users, that is, $$\frac{\bar{h}_i}{\|\bar{h}_i\|},$$

and W itself is a unitary matrix, then U may be constructed as:

$U = [\text{last}(M-N)\text{columns of } W, \text{first } N \text{ columns of } W] \quad (32).$ The steps to obtain the superdirective zero forcing precoding matrix for each terminal user are as follows:

S1: loop 1: u=1, . . . ,K;
S2: calculating the interference covariance matrix according to formula (30);
S3: calculating the SVD decomposition of the interference covariance matrix, as shown in formula (31);
S4: constructing the unitary matrix U according to formula (32);
S5: obtaining q according to formula (24);
S6: obtaining the matrix $\Xi$ according to formula (25);
S7: obtaining $a_u$ according to formula (28);
S8: obtaining the precoding matrix $a_u$ of the $u^{th}$ terminal user according to formula (29); and ending loop 1.

Therefore, the disclosure provides a superdirective antenna array multi-user precoding method, including:

constructing a unitary matrix $U \in C^{M \times M}$ for terminal users u, last $N(N \leq K-1)$ columns of the unitary matrix U are an orthonormal basis of an interfering user channel space span $\{h_i, i=1, \ldots, K, i \neq u\}$ respectively, wherein N is a dimension of the interfering user channel space, $h_i \in C^{M \times 1}$ represents channel state information of the $i^{th}$ terminal user, M is the total number of antennas on a network device side, K is the total number of terminal users communicating, and $M \geq K$ is satisfied;

intercepting first M−N rows of a matrix $U^H h_u$ to obtain a matrix $\eta_u$, wherein $\eta_u \in C^{(M-N) \times 1}$, $h_u$ represents the channel state information of the $u^{th}$ terminal user, and the superscript H represents a conjugate transpose;

intercepting first M−N rows and first M−N columns of a matrix $U^H Z U$ to obtain a matrix $\Xi$, wherein $\Xi \in C^{(M-N) \times (M-N)}$ the matrix $Z \in C^{M \times M}$, and elements in Z represent coupling coefficients of any two antennas;

calculating a precoding matrix $a_u = U$ $$a_u = U \begin{pmatrix} \alpha_u \\ 0 \end{pmatrix}$$

of the $u^{th}$ terminal user, wherein $\alpha = \Xi^{-1} \eta_u^*$, and the superscript * represents a conjugation.

2.2. Disclosure Solution Two: Superdirective Interference Null Space Projection Method Considering that Solution One requires multiple matrix operations, the disclosure provides a simplified solution of the Disclosure Solution One: a superdirective interference null space projection method.

The optimization problem is considered again $$\max \frac{a_u^H h_u h_u^H a_u}{a_u^H Z a_u} \quad (33)$$

$$\text{s.t. } h_i^H a_u = 0, i = 1, \ldots, K, i \neq u.$$

The idea of solving this optimization problem in this solution is to find an optimal solution of an objective function first, and then project this optimal solution onto the null space of the interfering user.

According to formula (18), the optimal solution of the objective function is:

$$a_M^{opt} = Z^{-1} h_u^* \quad (34).$$

The null space of interfering user may be obtained using formula (32), defining $$R = \text{last}(M-N) \text{columns of } W \quad (35).$$

Then the projection of the optimal solution onto the null space of the interfering user is:

$$a_u = R R^H a_u^{opt} \quad (36).$$

Therefore, the disclosure provides another superdirective antenna array multi-user precoding method, includes:

constructing a unitary matrix $W \in C^{M \times M}$ for terminal users u, first $N(N \leq K-1)$ columns of the unitary matrix W is an orthonormal basis of an interfering user channel space span $\{h_i, i=1, \ldots, K, i \neq u\}$ respectively, wherein N is a dimension of the interfering user channel space, $h_i \in C^{M \times 1}$ represents channel state information of an $i^{th}$ terminal user, M is the total number of antennas on a network device side, K is the total number of terminal users communicating, and $M \geq K$ is satisfied;

intercepting the last M−N columns of the unitary matrix W to obtain a matrix R, wherein $R \in C^{M \times (M-N)}$;

calculating a precoding matrix $a_u = R R^H a_u^{opt}$ of the $u^{th}$ terminal user, wherein $a_u^{opt} = Z^{-1} h_u^*$, $h_u$ represents the channel state information of the $u^{th}$ terminal user, the matrix $Z \in C^{M \times M}$, elements in Z represent coupling coefficients of any two antennas, the superscript H represents a conjugate transpose, and the superscript * represents a conjugation.

2.3. Disclosure Solution Three: Regularized Superdirective Zero Forcing Multi-User Transmission In an actual superdirective multi-user communication system, system capacity may decrease due to ohmic loss and inaccurate channel estimation. The disclosure therefore provides solution three: regularized superdirective zero forcing multi-user transmission, that is, to solve the following optimization problem:

$$\max \frac{a_u^H h_u h_u^H a_u}{a_u^H Z_R a_u} \quad (37)$$

$$\text{s.t. } h_i^H a_u = 0, i = 1, \ldots, K, i \neq u,$$

wherein $$Z_R = Z + \Lambda \quad (38).$$

$\Lambda$ is a regularization matrix. Noting that the solution to the optimization problem (37) is consistent with the solution to the optimization problem (21), and three methods for determining $\Lambda$ are introduced in the following paragraphs.

In the first method, $\Lambda$ is determined by the material and structure of the antenna unit. Considering that the radiation resistance of the antenna is $R_{rad}$. In the array, the radiation resistance of the entire antenna array is affected by coupling and becomes: $R_{rad} = R_{rad} Z$. Therefore, the radiation efficiency of the antenna is:

$$\eta = \frac{P_{rad}}{P_{rad} + P_{loss}} = \frac{a^H R_{rad} a}{a^H R_{rad} a + P_{loss}} \quad (39)$$

the gain of the antenna is the product of radiation efficiency and directivity coefficient:

$$G = \eta D = \eta \frac{a^H e e^H a}{a^H Z a}. \quad (40)$$

substituting into formula (39), G may be expressed as $$G = \frac{a^H ee^H a}{a^H Z a + \frac{P_{loss}}{R_{rad}}} = \frac{a^H ee^H a}{a^H Z a + \frac{r_{loss} a^H a}{R_{rad}}}, \quad (41)$$

$$\Lambda = \frac{r_{loss}}{R_{rad}} I_M$$

may be obtained

For a dipole antenna, the antenna loss $r_{loss}$ is:

$$r_{loss} = \frac{L}{6\pi a}\sqrt{\frac{\pi f \mu}{\sigma}}, \quad (42)$$

wherein $\alpha$ is the radius of the dipole antenna, L is the length, $f$ is the operating frequency, $\mu$ is the magnetic permeability of the material, and $\sigma$ is the electrical conductivity of the material.

The radiation impedance $R_{mad}$ is:

$$R_{rad} \approx 24.7(kL/2)^{2.5} \quad (43).$$

In the second method, $\Lambda$ is determined by inaccurate channel estimation. Considering if the channel estimation for each user has Gaussian white noise with zero mean and variance $\sigma^2$, that is, the channel estimation $\hat{h}_u$ of the $u^{th}$ terminal user is:

$$\hat{h}_u = h_u + n_u \quad (44),$$

wherein $n_u$ is the estimated Gaussian noise, which satisfies $n_u \sim C(0,\epsilon^2)$, that is, $n_u$ obeys a complex Gaussian distribution with zero mean and variance $\epsilon^2$, and $\|h_u\|=1$. According to the calculation method of the elements in Z according to the formula (12), the calculation method of the elements in $Z_R$ may be obtained as:

$$z_{lm}^R = \frac{1}{4\pi}\mathbb{E}\left\{\int_0^{2\pi}\int_0^{\pi}|k(\theta,\phi)|^2\left(e^{jk\hat{r}\cdot r_i}+n_l\right)\left(e^{-e^{jk\hat{r}\cdot r_m}}+n_m\right)\sin\theta d\theta d\phi\right\}, \quad (45)$$

wherein $\mathbb{E}\{\cdot\}$ is the expectation operator, then $$A = \frac{\epsilon^2}{4\pi}\int_0^{2\pi}\int_0^{\pi}|k(\theta,\phi)|^2 d\theta d\phi I_M, \quad (46)$$

wherein $I_M$ is the matrix of M×M.

The third method is to consider both the ohmic loss and the channel estimation error, then $$\Lambda = \frac{r_{loss}}{R_{rad}}I_M + \frac{\epsilon^2}{4\pi}\int_0^{2\pi}\int_0^{\pi}|k(\theta,\phi)|^2 d\theta d\phi I_M. \quad (47)$$

3.1 Specific Application Steps

Through Solution One to Solution Three provided by the disclosure, the precoding matrix $a_u$ of the $u^{th}$ terminal user may be calculated.

Further, let $P_{tot}$ be the transmit power of the base station, each user is allocated equal power, and the Gaussian white noise power is $\sigma^2$, then the transmit signal-to-noise ratio is:

$$SNR = \frac{P_{tot}}{\sigma^2}. \quad (48)$$

Considering that K is the total number of terminal users communicating, the precoding matrix of the $u^{th}$ terminal user is $a_u$, and the channel state information is $h_u$, then the total system throughput SE is:

$$SE = \sum_{u=1}^{K}\log_2\left(1 + \frac{|h_u^T a_u|^2}{\sum_{j\neq u}|h_j^T a_j|^2 + \sigma^2}\right). \quad (49)$$

Each beamforming vector is power constrained, such that the transmit power for each user is $$a_u^H Z a_u = \frac{P_{tot}}{K}\left(a_u^H Z_R a_u = \frac{P_{tot}}{K}\right)$$

when ohmic loss or channel estimation errors are taken into account).

3.2 Simulation Results

First, the signal enhancement effect on a pair of target users and the signal suppression effect on other users produced by Disclosure Solution One are simulated without loss of generality, in this simulation, the number of antennas is set to 20, the spacing is 0.25 wavelength, the number of users is 4, the target user is located at 76°, and other users are located at −51°, 9°, and 39°. The direction graph obtained by performing superdirective zero forcing beamforming on the target user is shown in FIG. 1.

It can be seen from FIG. 1 that the signal strength from the angle of the target user is the strongest, while the signal strength from the angles of other users is close to 0, indicating that Disclosure Solution One may effectively enhance the signal of the target user while reducing interference to other users.

Figure 2:
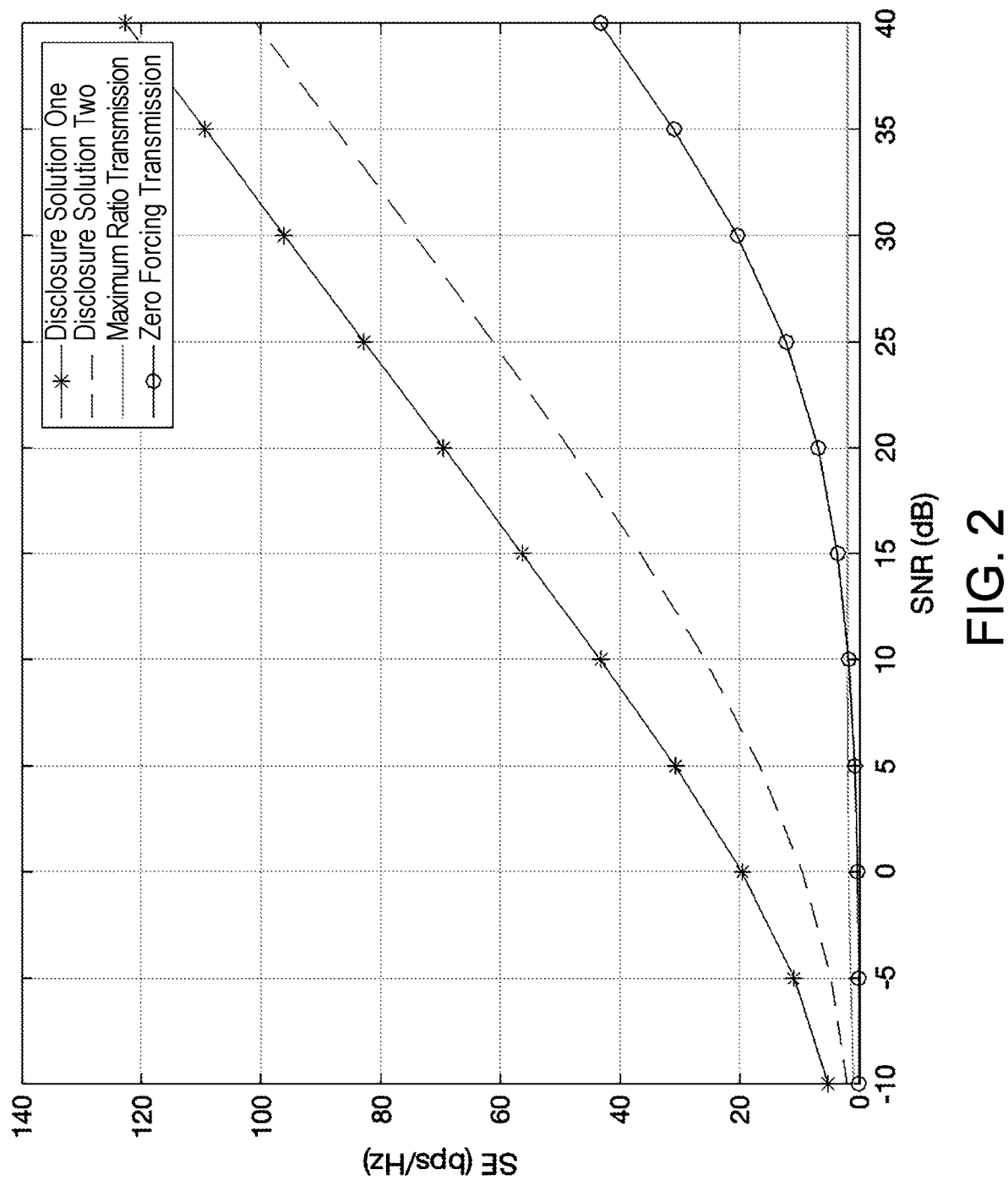
FIG. 2 is a graph comparing spectral efficiencies SE-SNR among Disclosure Solution One, Disclosure Solution Two, a conventional maximum ratio transmission solution, and a zero forcing transmission solution in the case of simulating multiple users provided by the disclosure.

Next is a graph comparing spectral efficiencies-SNR among Disclosure Solution One, Disclosure Solution Two, a conventional maximum ratio transmission solution, and a zero forcing transmission solution in the case of simulating multiple users, in this simulation, the number of antennas is set to 20, the spacing is 0.25 times the wavelength, the number of users is 8, and the simulation results are shown in FIG. 2.

It can be seen from FIG. 2 that by considering the coupling in the compact array and taking advantage of its superdirectivity, the spectral efficiency is greatly improved in the disclosure compared to the conventional maximum ratio transmission and zero forcing transmission solutions. Within the entire SNR range, Disclosure Solution One performs best because it not only utilizes superdirectivity to enhance user signals, but also considers the impact of interference from other users. Disclosure Solution Two simply projects the optimal solution of superdirective forming onto the null space of interfering users, so its performance is not as good as that of Disclosure Solution One, but it is better than the conventional maximum ratio transmission and zero forcing solutions. However, the maximum ratio transmission and the zero forcing transmission ignore the coupling of the antenna array and do not utilize its super-directivity, so their performance at each SNR is not as good as the solutions provided by the disclosure.

Next, the system spectrum efficiency when ohmic loss is considered is simulated, a comparison of Disclosure Solution Three is added, considering that each antenna operates in the 1.6 GHz frequency band, the material is copper, the radius is 0.75 mm, the length is 85 mm, the magnetic permeability is $4\pi \times 10^{-7}$, the electrical conductivity is $5.8 \times 10^7$, the number of antennas is 20, the spacing is 0.25 wavelength, and the number of users is 8. The simulation results are shown in FIG. 3.

Figure 3:
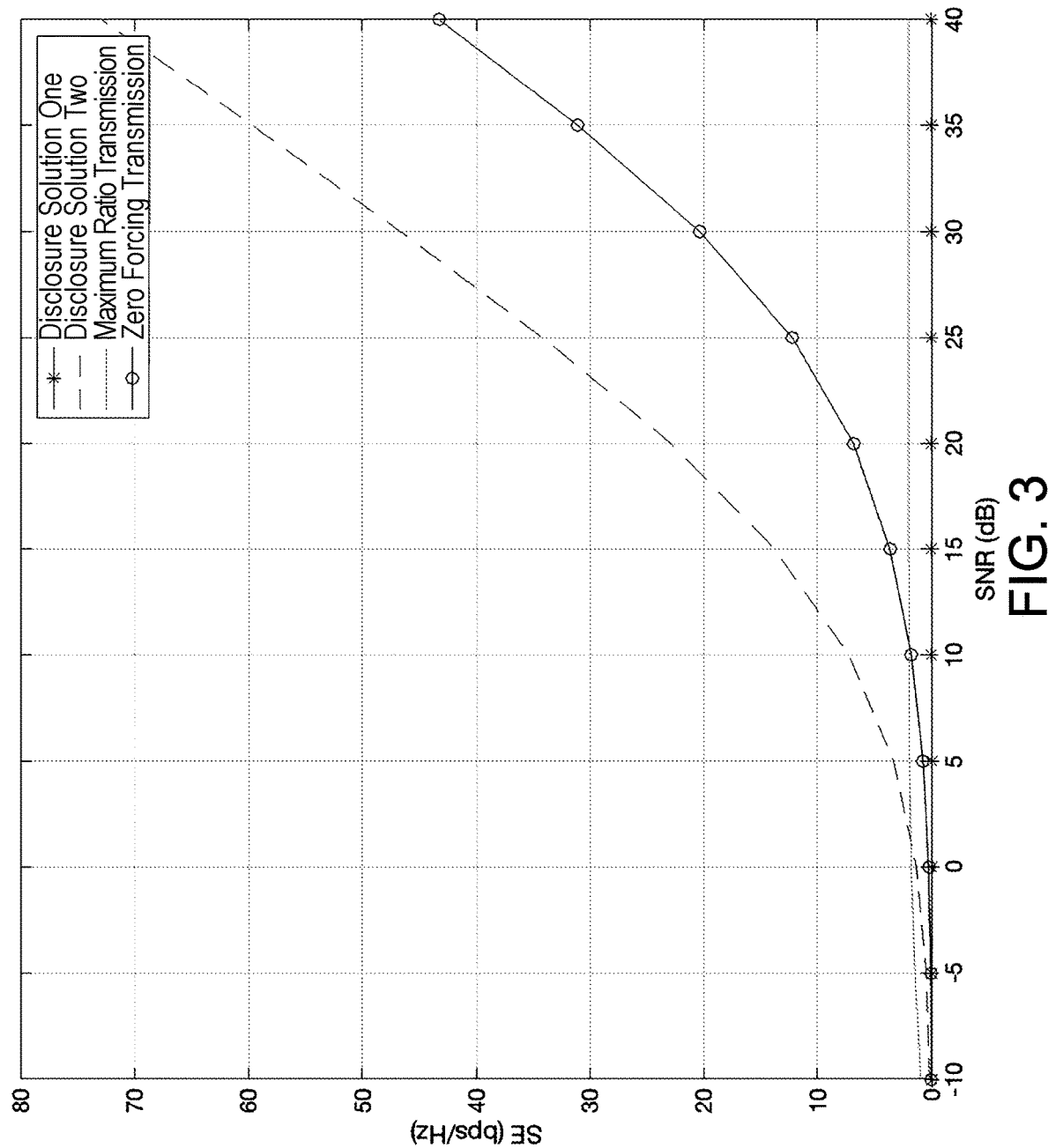
FIG. 3 is a graph comparing spectral efficiencies SE-SNR among Disclosure Solution One, Disclosure Solution Three, the conventional maximum ratio transmission solution, and the zero forcing transmission solution in the case of simulating multiple users provided by the disclosure.

It can be seen from FIG. 3 that Disclosure Solution One performs poorly because ohmic loss is not taken into account, while Disclosure Solution Three achieves an improvement in spectral efficiency by introducing a regularization matrix and performs best among all solutions.

Embodiment Two

A network device, includes:

A structural unit, configured to construct a unitary matrix $U \in C^{M \times M}$ for terminal users u, last $N(N \leq K-1)$ columns of the unitary matrix U are an orthonormal basis of an interfering user channel space span $\{h_i, i=1, \ldots, K, i \neq u\}$ respectively, wherein N is a dimension of the interfering user channel space, $h_i \in C^{M \times 1}$ represents channel state information of the $i^{th}$ terminal user, M is the total number of antennas on a network device side, K is the total number of terminal users communicating, and $M \geq K$ is satisfied;

A first interception unit, configured to intercept first M−N rows of a matrix $U^H h_u$ to obtain a matrix $\eta_u$, wherein $\eta_u \in C^{(M-N) \times 1}$, $h_u$ represents the channel state information of the $u^{th}$ terminal user, and the superscript H represents a conjugate transpose;

A second interception unit, configured to intercept first M−N rows, first M−N columns of the matrix $U^H Z U$ to obtain a matrix $\Xi$, wherein $\Xi \in C^{(M-N) \times (M-N)}$ and elements in Z represent coupling coefficients of any two antennas;

A calculation unit, configured to calculate a precoding matrix $a_u = U$ $$a_u = U \begin{pmatrix} \alpha_u \\ 0 \end{pmatrix}$$

of the $u^{th}$ terminal user, where $\alpha = \Xi^{-1} \eta_u^*$, and the superscript * represents a conjugation.

The relevant technical solutions are the same as those in Embodiment One and description thereof is thus not repeated herein.

Another Network Device Includes:

A structural unit, configured to construct a unitary matrix $W \in C^{M \times M}$ for terminal users u, the first $N(N \leq K-1)$ columns of the unitary matrix W are an orthonormal basis of an interfering user channel space span $\{h_i, i=1, \ldots, K, i \neq u\}$ respectively, wherein N is a dimension of the interfering user channel space, $h_i \in C^{M \times 1}$ represents channel state information of the $i^{th}$ terminal user, M is the total number of antennas on a network device side, K is the total number of terminal users communicating, and $M \geq K$ is satisfied;

An interception unit, configured to intercept last M−N columns of the unitary matrix W to obtain a matrix R, wherein $R \in C^{M \times (M-N)}$;

A calculation unit, configured to calculate a precoding matrix $a_u = RR^H a_u^{opt}$ of a $u^{th}$ terminal user, wherein $a_u^{opt} = Z^{-1} h_u^*$, the superscript * represents a conjugation, $h_u$ represent the channel state information of the $u^{th}$ terminal user, the matrix $Z \in C^{M \times M}$, elements in Z represent coupling coefficients of any two antennas, and the superscript H represents a conjugate transpose.

The relevant technical solutions are the same as those in Embodiment One and description thereof is thus not repeated herein.

Embodiment Three

An electronic device, includes:

A processor; and

A memory, configured to store an executable command of the processor;

Wherein, the processor is configured to execute the superdirective antenna array multi-user precoding method according to Embodiment One through the executable command.

The relevant technical solutions are the same as those in Embodiment One and description thereof is thus not repeated herein.

Embodiment Four

A computer readable storage medium, the computer readable storage medium stores a computer-executable command, when a processor executes the computer-executable command, the superdirective antenna array multi-user precoding method according to Embodiment One is implemented.

The relevant technical solutions are the same as those in Embodiment One and description thereof is thus not repeated herein.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A superdirective antenna array multi-user precoding method, the method comprising:
constructing a unitary matrix $U \in C^{M \times M}$ for terminal users u, last $N(N \leq K-1)$ columns of the unitary matrix U being an orthonormal basis of an interfering user channel space span $\{h_i, i=1, \ldots, K, i \neq u\}$ respectively, wherein N is a dimension of an interfering user channel space, $h_i \in C^{M \times 1}$ represents a channel state information of an $i^{th}$ terminal user, M is a total number of antennas on a network device side, K is a total number of terminal users communicating, and $M \geq K$ is satisfied;
intercepting first M−N rows of a matrix $U^H h_u$ to obtain a matrix $\eta_u$, wherein $\eta_u \in C^{(M-N) \times 1}$, $h_u$ represents a channel state information of a $u^{th}$ terminal user, and a superscript H represents a conjugate transpose;
intercepting first M−N rows and first M−N columns of a matrix $U^H Z U$ to obtain a matrix $\Xi$, wherein $\Xi \in C^{(M-N) \times (M-N)}$, a matrix $Z \in C^{M \times M}$, and elements in z represent coupling coefficients of any two antennas; and
calculating a precoding matrix $a_u = U$ $$a_u = U \begin{pmatrix} \alpha_u \\ 0 \end{pmatrix}$$

of the $u^{th}$ terminal user, where
$\alpha_u = \Xi^{-1} \eta_u^*$, and a superscript * represents a conjugation.

2. The superdirective antenna array multi-user precoding method according to claim 1, wherein before intercepting first M−N rows and first M−N columns of the matrix $U^H Z U$ to obtain the matrix $\Xi$, the method further comprises: updating matrix z to Z+Λ, wherein $\Lambda \in C^{M \times M}$ is a regularization matrix of the matrix Z.

3. The superdirective antenna array multi-user precoding method according to claim 2, wherein the regularization matrix Λ is:

$$A = \frac{r_{loss}}{R_{rad}} I_m,$$

$$r_{loss} = \frac{L}{6\pi a} \sqrt{\frac{\pi f \mu}{\sigma}}, \text{ and}$$

$$R_{rad} \approx 24.7 (kL/2)^{2.5},$$

wherein $r_{loss}$ and $R_{rad}$ are a loss and a radiation impedance of an antenna respectively, $I_M$ is a unit matrix of M×M, and L, α, f, ƒ, µ, σ, and κ are a length, a radius, an operating frequency, a magnetic permeability, a conductivity and a wave number of an antenna respectively.

4. The superdirective antenna array multi-user precoding method according to claim 2, wherein the regularization matrix Λ is:

$$\Lambda = \frac{\epsilon^2}{4\pi} \int_0^{2\pi} \int_0^{\pi} |k(\theta, \phi)|^2 d\theta d\phi I_M,$$

wherein $\epsilon^2$ is a Gaussian noise power, $\kappa(\theta, \Phi)$ is a pattern function of an antenna, θ and Φ are far-field coordinate components in a spherical coordinate system, and $I_M$ is a unit matrix of M×M.

5. The superdirective antenna array multi-user precoding method according to claim 2, wherein the regularization matrix Λ is:

$$A = \frac{r_{loss}}{R_{rad}} I_M + \frac{\epsilon^2}{4\pi} \int_0^{2\pi} \int_0^{\pi} |k(\theta, \phi)|^2 d\theta d\phi I_M,$$

$$r_{loss} = \frac{L}{6\pi a} \sqrt{\frac{\pi f \mu}{\sigma}}, \text{ and}$$

$$R_{rad} \approx 24.7 \ (kL/2)^{2.5}$$

wherein $r_{loss}$ and $R_{rad}$ are a loss and a radiation impedance of an antenna respectively, $I_M$ is a unit matrix of M×M, L, α, ƒ, µ, σ, and κ are a length, a radius, an operating frequency, a magnetic permeability, a conductivity and a wave number of an antenna respectively, $\epsilon^2$ is a Gaussian noise power, $\kappa(\theta, \Phi)$ is a pattern function of the antenna, and θ and Φ are far-field coordinate components in a spherical coordinate system.

6. The superdirective antenna array multi-user precoding method according to claim 1, wherein the constructing the unitary matrix $U \in C^{M \times M}$ specifically is:
constructing a total interference covariance matrix:

$$R_{int} = \sum_{i \neq u} (h_i h_i^H),$$

performing a singular value decomposition (SVD) decomposition on $R_{int}$ to obtain:

$$R_{int} = W^H \Lambda_W,$$

wherein W is a unitary matrix, unitary matrix U is:
[last (M−N) columns of W, first N columns of W].

7. The superdirective antenna array multi-user precoding method according to claim 1, wherein the matrix $$Z = \begin{bmatrix} z_{11} & \cdots & z_{1M} \\ \vdots & \ddots & \vdots \\ z_{M1} & \cdots & z_{MM} \end{bmatrix},$$

$$z_{mn} = \frac{1}{4\pi} \int_0^{2\pi} \int_0^{\pi} |k(\theta, \phi)|^2 e^{jk\hat{r} \cdot r_m} e^{-jk\hat{r} \cdot r_n} \sin\theta d\theta d\phi,$$

wherein $z_{mn}$ represents a coupling coefficient of a $m^{th}$ antenna and a $n^{th}$ antenna, $\kappa(\theta, \Phi)$ is a pattern function of an antenna, θ and Φ are far-field coordinate components in a spherical coordinate system, k is a wave number of an antenna, $\hat{r}$ is a unit vector in a spherical coordinate system, $r_m$ and $r_n$ are the coordinates of the $m^{th}$ antenna and the $n^{th}$ antenna respectively, m=1, . . . ,M, and n=1, . . . ,M.

8. The superdirective antenna array multi-user precoding method according to claim 1, wherein each of the last N(N≤K−1) columns of the unitary matrix U being an orthonormal basis of an interfering user channel space span {$h_i$,i=1, . . . ,K,i≠u}, comprises:
letting $[v_1, \ldots, v_{K-1}] \in C^{M \times (K-1)}$ be a matrix formed by an interfering user channel vector, if N=K−1, the last K−1 columns of the unitary matrix U are $$\frac{\bar{v}_i}{\|\bar{v}_i\|},$$

i=1, . . . , K−1, wherein:

$$\begin{cases} \bar{v}_1 = \frac{v_1}{\|v_1\|} \\ \bar{v}_2 = v_2 - \frac{\bar{v}_1^H v_2}{\|\bar{v}_1\|} \bar{v}_1, \\ \bar{v}_3 = v_3 - \frac{\bar{v}_1^H v_3}{\|\bar{v}_1\|} \bar{v}_1 - \frac{\bar{v}_2^H v_3}{\|\bar{v}_2\|} \bar{v}_2 \\ \vdots \\ \bar{v}_{K-1} = v_{K-1} = \frac{\bar{v}_1^H v_{K-1}}{\|\bar{v}_1\|} \bar{v}_1 - \ldots - \frac{\bar{v}_{K-2}^H v_{K-1}}{\|\bar{v}_{K-2}\|} \bar{v}_{K-2} \end{cases} ;$$

if N≤K−1, obtaining N non-zero vectors after calculating $$\frac{\bar{v}_i}{\|\bar{v}_i\|},$$

i=1, . . . , K−1, selecting the N non-zero vectors as the last N columns of U.

9. A superdirective antenna array multi-user precoding method, the method comprising:
constructing a unitary matrix $w \in C^{M \times M}$ for terminal users U, first N(N≤K−1) columns of the unitary matrix w being an orthonormal basis of an interfering user channel space span $\{h_i, i=1, \ldots, K, i \neq u\}$ respectively, wherein N is a dimension of an interfering user channel space, $h_i \in C^{M \times 1}$ represents a channel state information of an $i^{th}$ terminal user, M is a total number of antennas on a network device side, K is a total number of terminal users communicating, and $M \geq K$ is satisfied;

intercepting last M−N columns of unitary matrix w and obtaining a matrix R, A wherein $R \in C^{M \times (M-N)}$; and calculating a precoding matrix $a_u = RR^H a_u^{opt}$ of the $u^{th}$ terminal user, wherein $a_u^{opt} = Z^{-1} h_u^*$, $h_u$ represent a channel state information of the $u^{th}$ terminal user, a matrix $z \in C^{M \times M}$, elements in Z represent coupling coefficients of any two antennas, a superscript H represents a conjugate transpose, and a superscript * represents a conjugation.

10. A network device, comprising:

a structural circuit configured to construct a unitary matrix $U \in C^{M \times M}$ for terminal users u, last N(N≤K−1) columns of the unitary matrix U is an orthonormal basis of an interfering user channel space span $\{h_i, i=1, \ldots, K, i \neq u\}$ respectively, N is a dimension of an interfering user channel space, $h_i \in C^{M \times 1}$ represents a channel state information of the $i^{th}$ terminal user, M is a total number of antennas on a network device side, K is a total number of terminal users communicating, and $M \geq K$ is satisfied;

a first interception circuit configured to intercept first M−N rows of a matrix $U^H h_u$ to obtain a matrix $\eta_u$, wherein $\eta_u \in C^{(M-N) \times 1}$ represents a channel state information of an $u^{th}$ terminal user, a superscript H represents a conjugate transpose;

a second interception circuit configured to intercept first M−N rows, first M−N columns of a matrix $U^H Z U$ to obtain a matrix $\Xi$, wherein $\Xi \in C^{(M-N) \times (M-N)}$ a matrix $z \in C^{M \times M}$, elements in z represent coupling coefficients of any two antennas; and a calculation circuit configured to calculate a precoding matrix $a_u = U$ $$a_u = U \begin{pmatrix} \alpha_u \\ 0 \end{pmatrix}$$

of an $u^{th}$ terminal user, wherein $a_u = \Xi^{-1} \eta_u^*$, a superscript * represents a conjugation.

11. A network device, comprising:

a structural circuit configured to construct a unitary matrix $w \in C^{M \times M}$ for terminal users u, first N(N≤K−1) columns of the unitary matrix w is an orthonormal basis of an interfering user channel space span $\{h_i, i=1, \ldots, K, i \neq u\}$ respectively, N is a dimension of an interfering user channel space, $h_i \in C^{M \times 1}$ represents a channel state information of an $i^{th}$ terminal user, M is a total number of antennas on a network device side, K is a total number of terminal users communicating, and $M \geq K$ is satisfied;

an interception circuit configured to intercept last M−N columns of an A unitary matrix w to obtain a matrix R, wherein $R \in C^{M \times (M-N)}$; and a calculation circuit configured to calculate a precoding matrix $a_u = RR^H a_u^{opt}$ of an $u^{th}$ terminal user, wherein $a_u^{opt} = Z^{-1} h_u^*$, a superscript * represents a conjugation, $h_u$ represent a channel state information of an $u^{th}$ terminal user, a matrix $z \in C^{M \times M}$, elements in z represent coupling coefficients of any two antennas, and a superscript H represents a conjugate transpose.

12. An electronic device, comprising:

a processor; and a memory, configured to store an executable command of the processor, wherein the processor is configured to execute the superdirective antenna array multi-user precoding method according to claim 1 by executing the executable command.

13. A non-transitory computer readable storage medium, the non-transitory computer readable storage medium stores a computer-executable command, when a processor executes the computer-executable command, the superdirective antenna array multi-user precoding method according to claim 1 is implemented.

* * * * *